(12) United States Patent
Ko et al.

(10) Patent No.: US 11,267,124 B2
(45) Date of Patent: Mar. 8, 2022

(54) SYSTEM AND METHOD FOR CALIBRATING ROBOT

(71) Applicant: Samsung Electronics Co., Ltd., Gyeonggi-do (KR)

(72) Inventors: Inyoung Ko, Gyeonggi-do (KR); Kyungshik Roh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 16/680,909

(22) Filed: Nov. 12, 2019

(65) Prior Publication Data

US 2020/0156252 A1    May 21, 2020

(30) Foreign Application Priority Data

Nov. 16, 2018  (KR) .................. 10-2018-0141996

(51) Int. Cl.
*B25J 9/16* (2006.01)
*G01B 21/04* (2006.01)
*G01B 11/00* (2006.01)

(52) U.S. Cl.
CPC ............ *B25J 9/1692* (2013.01); *B25J 9/161* (2013.01); *G01B 21/042* (2013.01)

(58) Field of Classification Search
CPC ........ B25J 9/1692; B25J 9/161; B25J 9/1602; G01B 21/042; G01B 11/002; G05B 2219/39024
USPC .................................................. 700/245–264
See application file for complete search history.

(56) References Cited

U.S. PATENT DOCUMENTS

| | | | | | |
|---|---|---|---|---|---|
| 5,761,390 | A | * | 6/1998 | Koshishiba | B25J 9/1679 700/250 |
| 6,317,699 | B1 | * | 11/2001 | Watanabe | B25J 9/1692 702/94 |
| 6,519,860 | B1 | * | 2/2003 | Bieg | B23H 7/26 33/1 PT |
| 7,272,524 | B2 | * | 9/2007 | Brogardh | G05B 19/4083 702/95 |
| 7,853,359 | B2 | * | 12/2010 | Ban | B25J 9/1692 700/263 |
| 7,899,577 | B2 | * | 3/2011 | Ban | B25J 9/1692 700/245 |
| 8,369,993 | B2 | * | 2/2013 | Kagawa | B25J 9/1692 700/263 |
| 8,457,786 | B2 | * | 6/2013 | Andersson | G05B 19/401 700/245 |

(Continued)

*Primary Examiner* — Jaime Figueroa
(74) *Attorney, Agent, or Firm* — Cha & Reiter, LLC

(57) ABSTRACT

A method and system are disclosed herein. The system includes a measuring device detecting a position and a travel distance of movement of the robot, a communication circuit, a memory, and a processor. The processor implements the method, including: specifying a robot coordinate system of the robot based on the measured position data, generating, using the processor, robot reference position data by converting the measured position data based on the specified robot coordinate system, performing, using the processor, position-based parameter optimization based on the robot reference position data, and storing, using a memory, a parameter optimized through the position-based parameter optimization; and transmitting, using a communication circuit, the stored optimized parameter to the robot to actuate movement of the robot based on the stored optimized parameter.

20 Claims, 7 Drawing Sheets

(56) References Cited

U.S. PATENT DOCUMENTS

| | | | |
|---|---|---|---|
| 9,937,624 B2* | 4/2018 | Huang | B25J 9/1692 |
| 10,596,706 B2* | 3/2020 | Huang | B25J 9/1674 |
| 2005/0159842 A1* | 7/2005 | Ban | B25J 19/023 |
| | | | 700/245 |
| 2008/0004750 A1* | 1/2008 | Ban | B25J 9/1692 |
| | | | 700/245 |
| 2008/0188983 A1* | 8/2008 | Ban | G01B 21/042 |
| | | | 700/245 |
| 2009/0118864 A1* | 5/2009 | Eldridge | B25J 9/1692 |
| | | | 700/259 |
| 2010/0168915 A1* | 7/2010 | Kagawa | B25J 9/1692 |
| | | | 700/254 |
| 2011/0066393 A1* | 3/2011 | Groll | B25J 9/1676 |
| | | | 702/94 |
| 2014/0147240 A1* | 5/2014 | Noda | B25J 19/021 |
| | | | 414/751.1 |
| 2014/0229005 A1* | 8/2014 | Suzuki | B25J 9/1697 |
| | | | 700/254 |
| 2015/0158181 A1* | 6/2015 | Kawamura | B25J 9/1697 |
| | | | 700/259 |
| 2016/0184996 A1* | 6/2016 | Ishige | B25J 9/1694 |
| | | | 700/254 |
| 2017/0072566 A1* | 3/2017 | Murata | B25J 9/1692 |
| 2018/0004188 A1* | 1/2018 | Yamaguchi | B25J 13/02 |
| 2018/0032142 A1* | 2/2018 | Oshima | G06F 3/03545 |
| 2018/0117768 A1 | 5/2018 | Brogardh et al. | |
| 2018/0126557 A1* | 5/2018 | Gu | G05B 19/4015 |
| 2018/0194010 A1 | 7/2018 | Huang | |
| 2020/0406476 A1* | 12/2020 | Kato | B65G 65/34 |

* cited by examiner

SYSTEM AND METHOD FOR CALIBRATING ROBOT

CROSS-REFERENCE TO RELATED APPLICATION(S)

This application is based on and claims priority under 35 U.S.C. § 119 to Korean Patent Application No. 10-2018-0141996, filed on Nov. 16, 2018, in the Korean Intellectual Property Office, the disclosure of which is incorporated by reference herein its entirety.

BACKGROUND

1. Technical Field

The disclosure relates to a robotic assemblies, and, more particularly, to calibrating the actuation and movement of robotic members.

2. Description of Related Art

Recently, there has been an increase in widespread use of factory automation including a robot manipulator to improve productivity, reduce manpower, improve quality, and the like in industrial sites. To use the robot manipulator in the industrial site, high precision in repetitive movements is necessary. Further, in addition to repetition accuracy, absolute positional accuracy (e.g., "pose" accuracy) is a very important factor. To increase the pose accuracy of the robot, calibration must be performed. There are several types of available calibration techniques, including calibration for the purpose of position calibration with respect to peripheral equipment, calibration of a length of a tool attached to a robot front-end, and calibration of a relative position with cameras, sensors, and the like. Above all, there is a calibration of mechanism of the robot itself, for calibrating processing errors, assembling errors, and the like that occur during manufacture of the mechanism. This calibration of the robot should be performed as a basic operation for preparation of the robot. Maintaining high accuracy of the mechanism of the robot itself is important, as it affects the position calibration with the peripheral equipment, the tool and sensor position calibration, and the like mentioned above, is an essential element to use the robot.

The above information is presented as background information only to assist with an understanding of the disclosure. No determination has been made, and no assertion is made, as to whether any of the above might be applicable as prior art with regard to the disclosure.

SUMMARY

To identify a position and a set of travel distance values for a robot front-end, various measuring devices are used. A laser tracker, for example, is a representative measuring device. A conventional robot calibration method includes location-based calibration, which compares a robot front-end position calculated by a robot controller with a robot front-end position measured by the measuring device, and distance-based calibration comparing a robot front-end travel distance calculated by the robot controller with a robot front-end travel distance measured by the measuring device. However, in the position-based calibration, it is difficult to match a coordinate system of the measuring device and a coordinate system of the robot. The distance-based calibration does not require matching of the coordinate systems, but there are parameters (e.g., a length error of a first link fixed at a point) for which calibration may not be possible.

Certain embodiments of the disclosure aim to provide a robot calibration system that compensates for the shortcoming of each calibration by specifying the robot coordinate system through the distance-based calibration and then performing the position-based calibration based on the specified robot coordinate system.

Aspects of the disclosure are to address at least the above-mentioned problems and/or disadvantages and to provide at least the advantages described below. Accordingly, an aspect of the disclosure is to provide a method for calibrating a robot, including collecting, using a measuring device, measured position data for the robot including at least a coordinate indicating a position of a front-end of the robot, executing, using a processor, distance-based parameter optimization based on the measured position data, specifying a robot coordinate system of the robot based on the measured position data, generating, using the processor, robot reference position data by converting the measured position data based on the specified robot coordinate system, performing, using the processor, position-based parameter optimization based on the robot reference position data, storing, using a memory, a parameter optimized through the position-based parameter optimization, and transmitting, using a communication circuit, the stored optimized parameter to the robot to actuate movement of the robot based on the stored optimized parameter.

Accordingly, another aspect of the disclosure is to provide a system for calibrating a robot including a measuring device detecting a position and a travel distance of movement of the robot, a communication circuit, a memory and a processor, configured to: receive, through the communication circuit, from a robot controller controlling actuation of the robot, control position data and control distance data for controlling a position of a robot front-end of the robot, receive, using the measuring device, measured position data indicating a position of the front-end of the robot based on the control position data, execute a distance-based calibration by comparing a measured distance data calculated based on the measured position data with the control distance data, specify a robot coordinate system of the robot based on the measured position data and the control position data, and perform position-based calibration by comparing a robot reference position data with the control position data, wherein the robot reference position data is converted from the measured position data based on the specified robot coordinate system.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In the description of the drawings, the same or similar reference numerals may be used for the same or similar components.

DETAILED DESCRIPTION

Hereinafter, certain embodiments of the disclosure will be described with reference to accompanying drawings. Certain embodiments of the disclosure used herein are not intended to limit the disclosure to specific embodiments, and it should be understood that the embodiments include modification, equivalent, and/or alternative on the corresponding embodiments described herein.

Figure 1:
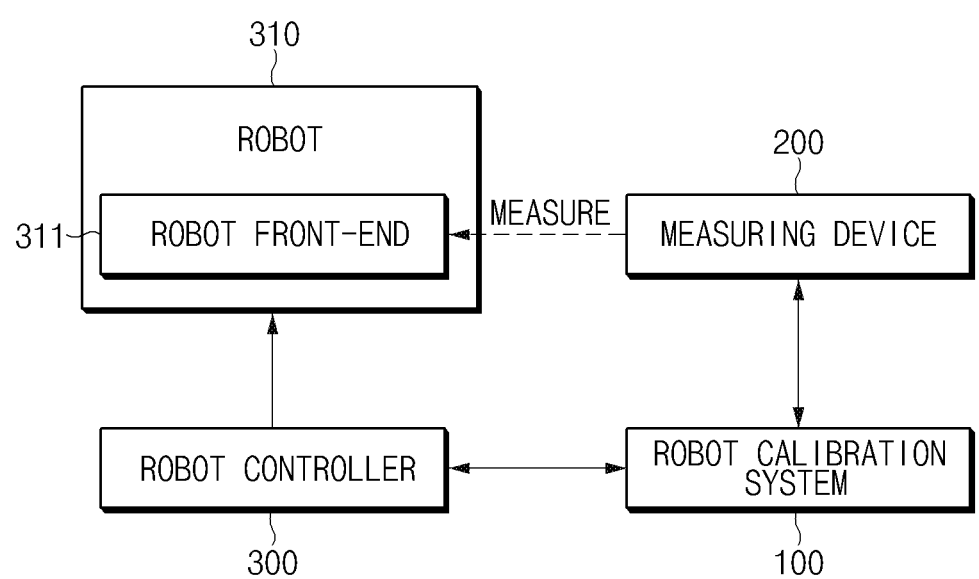
FIG. 1 is a block diagram illustrating an example robot calibration system according to an embodiment of the disclosure.

FIG. 1 is a block diagram illustrating an example robot calibration system 100 according to an embodiment of the disclosure.

According to one embodiment, the robot calibration system 100 may include at least a communication circuit, a memory, and a processor. The robot calibration system 100 may perform communication (e.g., short range communication) with a measuring device 200 (e.g., a laser tracker or other measuring sensors and circuitry) and a robot controller 300 via the communication circuit. The robot calibration system 100 may store information (e.g., measured position data, control position data, control distance data, and parameters) received from the measuring device 200 and the robot controller 300 in the memory. The robot calibration system 100 may store data (e.g., measured distance data, robot reference position data, and changed parameters) generated while performing the robot calibration method in the memory. The robot calibration system 100 may store programs for robot calibration (e.g., distance-based parameter optimization algorithm or location-based parameter optimization algorithm) in the memory. The robot calibration system 100 may execute the programs for the robot calibration stored in the memory via the processor.

According to one embodiment, the robot calibration system 100 may control the robot controller 300 to change a position of a robot front-end 311 to measure position information of the robot front-end 311 at various locations. The robot calibration system 100 may receive control position data from the robot controller 300. The control position data may include position information used by the robot controller 300 to move the robot front-end 311 from one designated point to another designated point. The robot controller 300 may change the position of the robot front-end 311 based on the control position data. The robot calibration system 100 may receive control distance data from the robot controller 300. The control distance data may include distance information used by the robot controller 300 to move the robot front-end 311 from one designated point to another designated point.

According to one embodiment, the robot calibration system 100 may control the measuring device 200 to measure the position of the robot front-end 311. For example, the robot calibration system 100 may change the position of the robot front-end 311 via the robot controller 300 and control the measuring device 200 to measure the changed position of the robot front-end 311. The robot calibration system 100 may receive the measured position data from the measuring device 200. The measured position data may include position information of the robot front-end 311 measured by the measuring device 200. The measured position data may include a plurality of position coordinates. The measuring device 200 may generate the measured position data, which is obtained by measuring the position of the robot front-end 311 based on a coordinate system (e.g., a coordinate system of the measuring device 200, including an arbitrary coordinate system).

According to one embodiment, the robot calibration system 100 may calculate a travel distance (e.g., measured distance data) of the robot front-end 311 based on the measured position data. The robot calibration system 100 may compare the measured distance data with the control distance data received from the robot controller 300. Based on a calculated difference (e.g., a distance error) between the measured distance data and the control distance data, the robot calibration system 100 may optimize (e.g., adjusting the parameters until the distance error becomes less than a reference error) parameters of a robot 310 (e.g., each link length or origin error of the robot 310) (e.g., by executing distance-based parameter optimization).

According to one embodiment, after performing the distance-based parameter optimization, the robot calibration system 100 may specify a robot coordinate system (e.g., a coordinate system that is basis of the control position data used by the robot controller 300) based on the measured position data. For example, the robot calibration system 100 may specify the robot coordinate system using a relative coordinate matrix of the robot 310 viewed from the measuring device, a relative coordinate matrix of the robot front-end 311 viewed from the measuring device, and a relative coordinate matrix of the robot front-end 311 viewed from the robot 310.

According to one embodiment, the robot calibration system 100 may perform position-based parameter optimization based on the specified robot coordinate system. For example, the robot calibration system 100 may convert the measured position data into robot reference position data using the specified robot coordinate system. The robot calibration system 100 may compare the robot reference position data with the control position data. Based on a difference (e.g., a position error) between the robot reference position data and the control position data, the robot calibration system 100 may optimize (e.g., adjust the parameters until the position error becomes less than a reference error) parameters of the robot 310 (e.g., executing a position-based parameter optimization). The robot calibration system 100 may pass the optimized parameters to the robot controller 300. The robot controller 300 may control the robot 310 based on the optimized parameters.

Figure 2A:
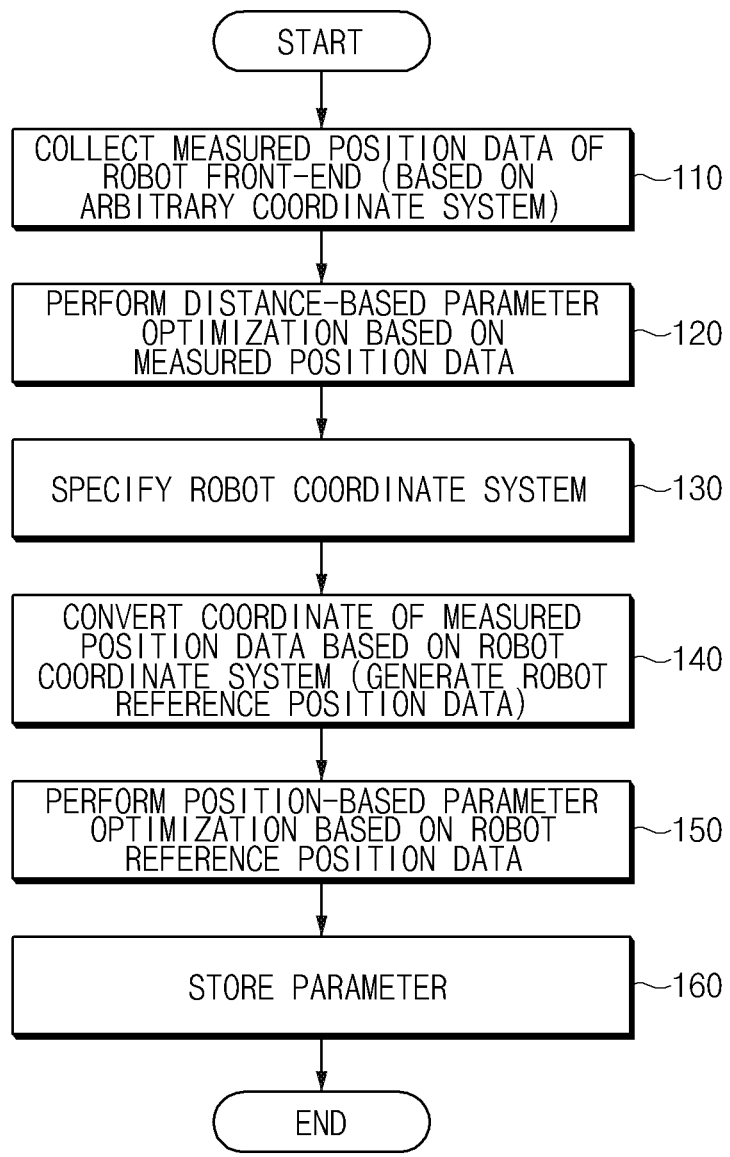
FIG. 2A is a flowchart illustrating an example robot calibration method according to an embodiment of the disclosure.
Figure 2B:
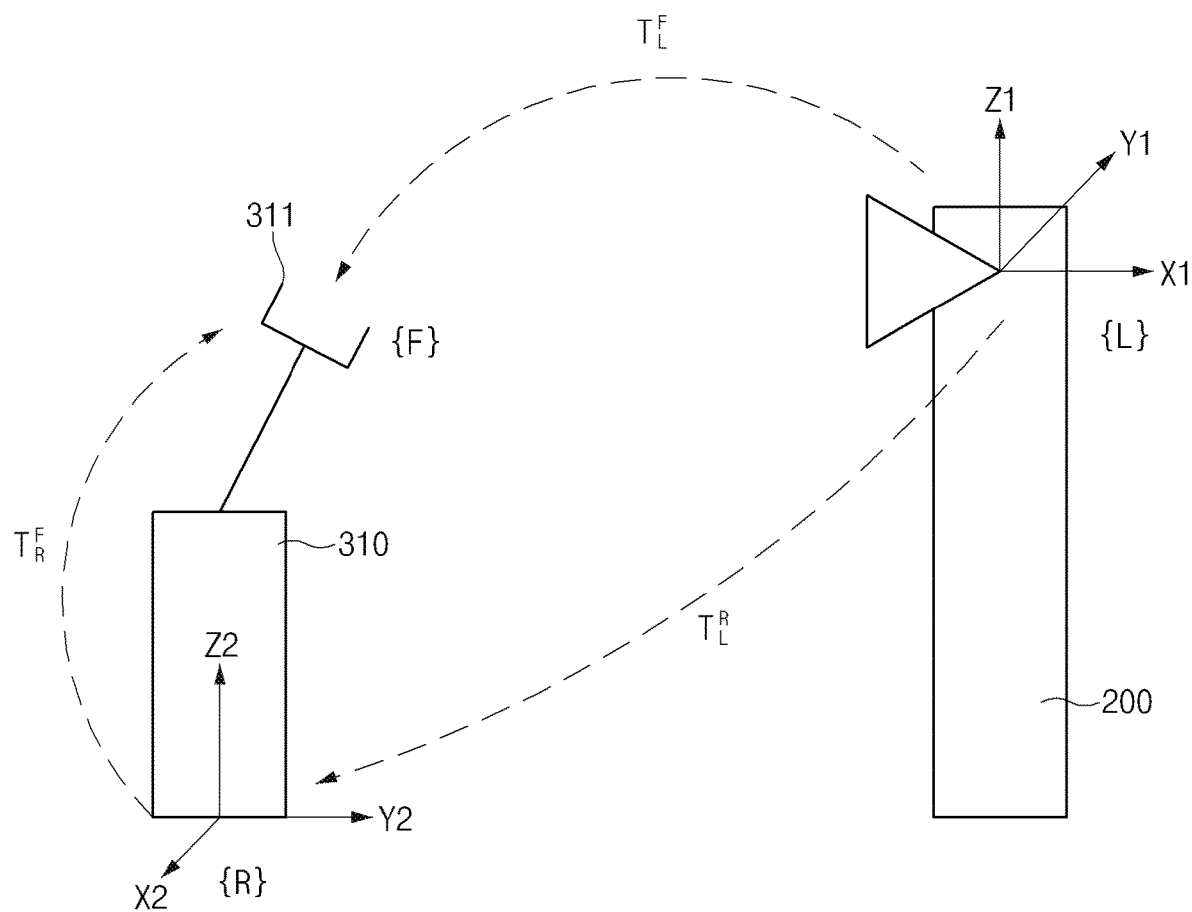
FIG. 2B is a diagram illustrating an example relationship between a measuring device coordinate system and a robot coordinate system according to an embodiment.
Figure 3A:
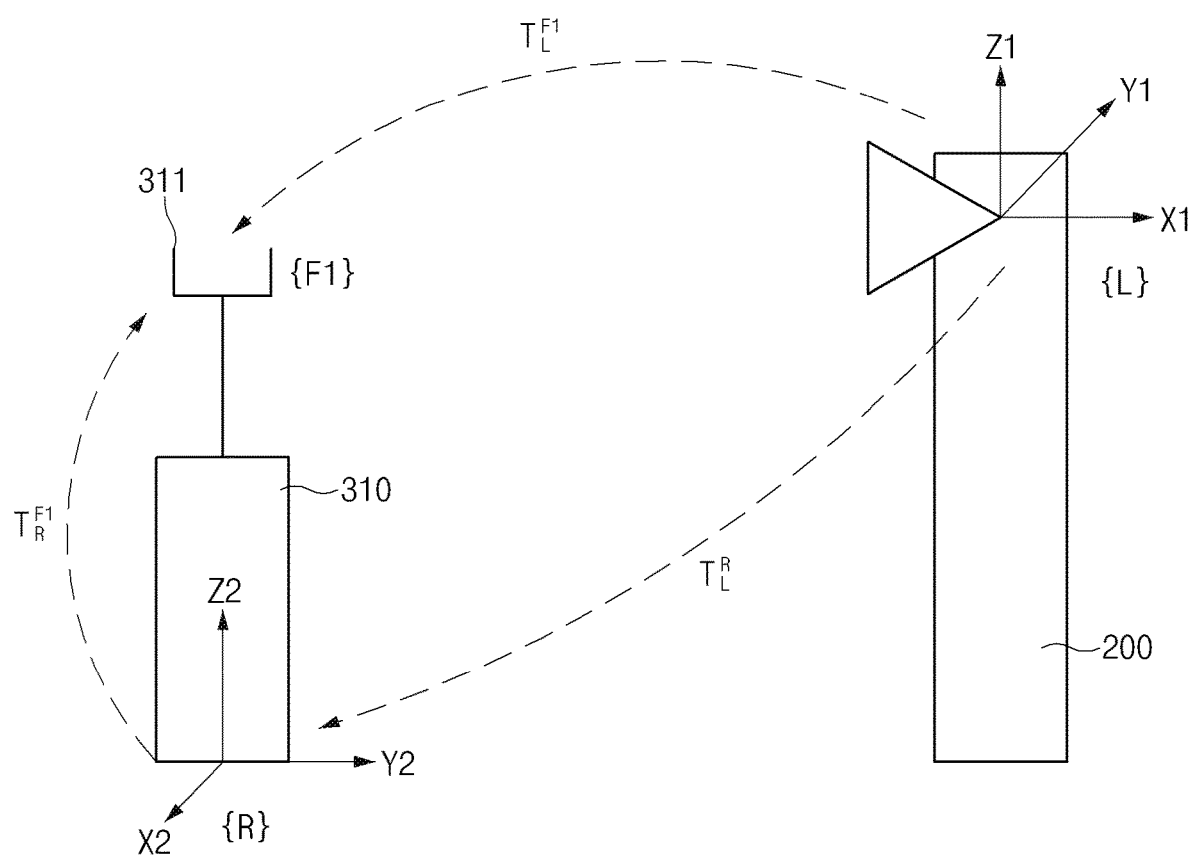
FIG. 3A is a diagram illustrating an example method for obtaining a robot coordinate system based on measured position data according to an embodiment.
Figure 3B:
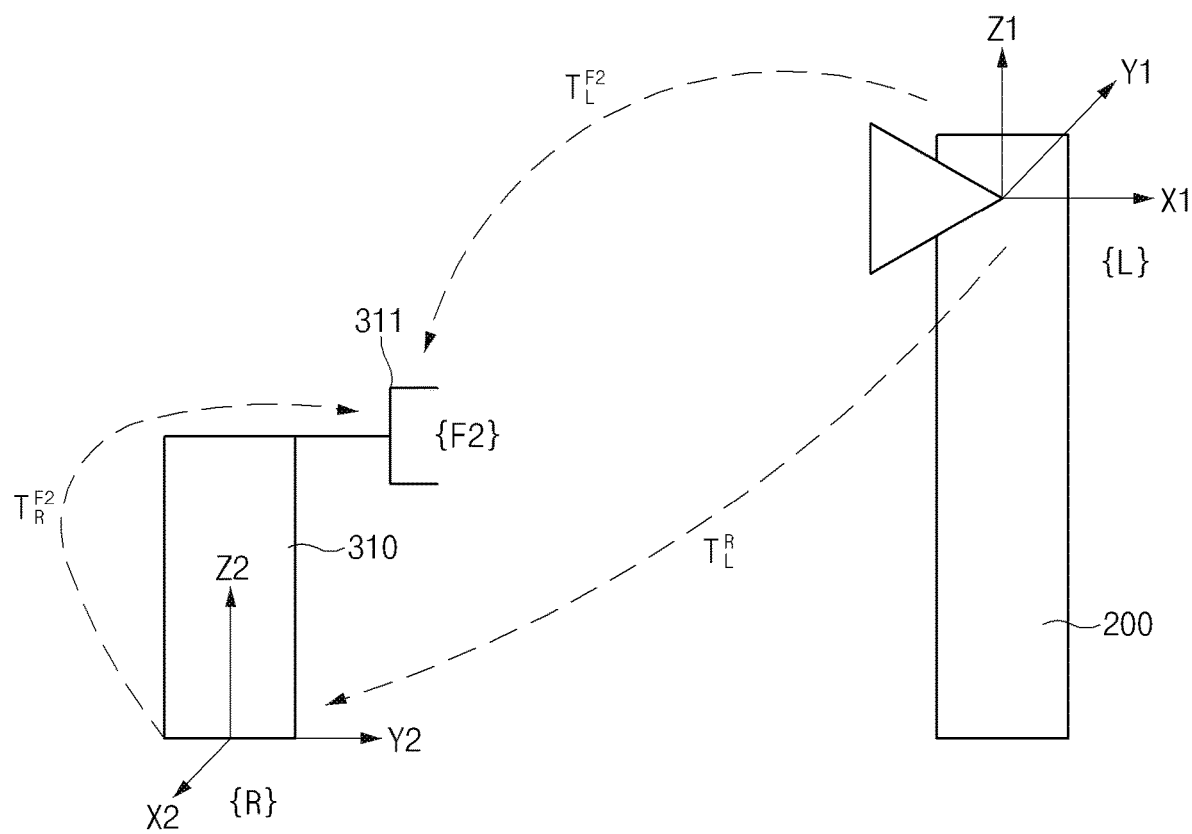
FIG. 3B is a diagram illustrating an example method for obtaining a robot coordinate system based on measured position data according to certain embodiments.
Figure 3C:
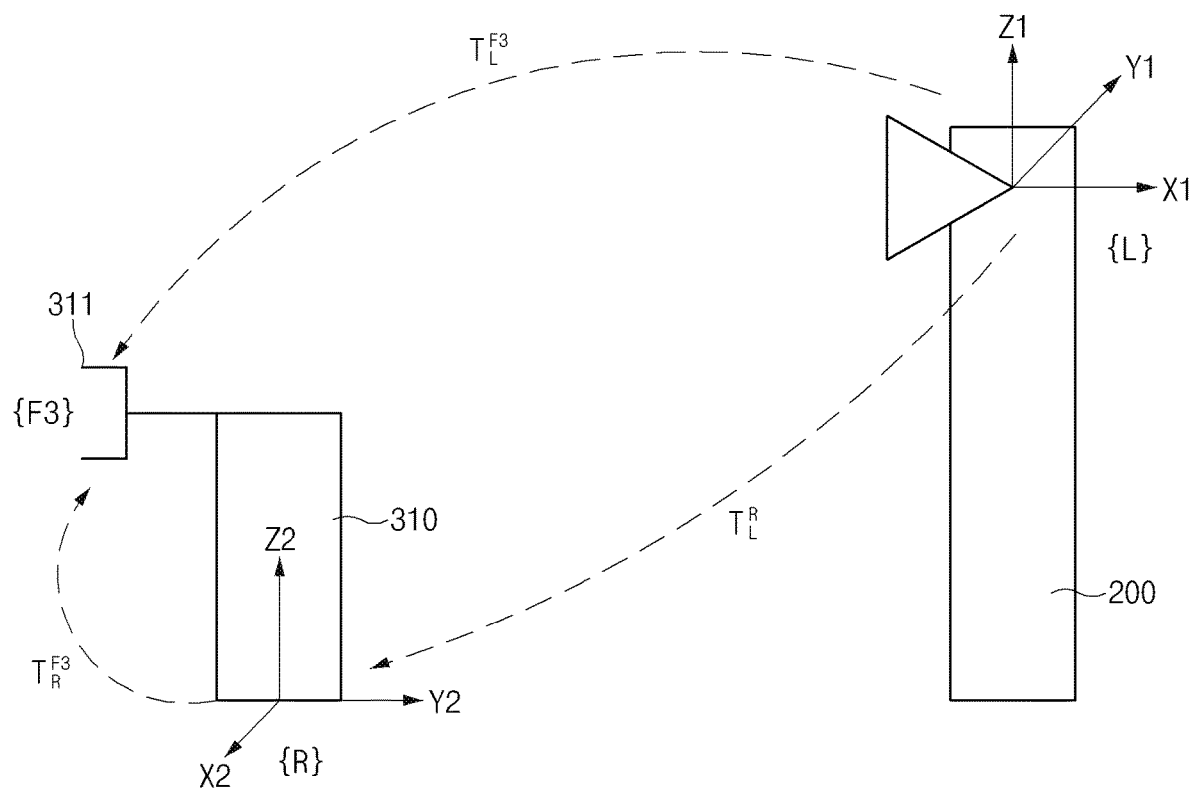
FIG. 3C is a diagram illustrating an example method for obtaining a robot coordinate system based on measured position data according to certain embodiments.

FIG. 2A is a flowchart illustrating an example robot calibration method according to an embodiment of the disclosure. Further, FIG. 2B is a diagram illustrating an example relationship between a coordinate system of the measuring device 200 and a robot coordinate system according to an embodiment. Further, FIGS. 3A to 3C are diagrams illustrating an example method for obtaining a robot coordinate system based on measured position data according to an embodiment.

According to one embodiment, in operation 110, the robot calibration system 100 may collect the position data of the robot front-end 311. For example, the measuring device 200 (e.g., the laser tracker) may generate the measured position data by measuring the position of the robot front-end 311. The robot calibration system 100 may receive the measured position data from the measuring device 200. The robot calibration system 100 may control the robot controller 300 to move the robot front-end 311 to the various locations. The robot calibration system 100 may control the measuring device to measure positions of the robot front-end 311 when the robot front-end 311 travels to the various locations. The robot calibration system 100 may collect a plurality of measured position data corresponding to the various locations. The robot calibration system 100 may repeat collection of the measured position data a predetermined number of times. The measured position data may be measured based on the "arbitrary" coordinate system (e.g., the coordinate system of the measuring device 200).

According to one embodiment, in operation 120, the robot calibration system 100 may perform the distance-based parameter optimization. For example, the robot calibration system 100 may calculate the measured distance data indicating the travel distance of the robot front-end 311 based on the collected measured position data. The robot calibration system 100 may select two coordinates from the measured position data and calculate a distance between the two coordinates. The robot calibration system 100 may optimize the parameters of the robot 310 (e.g., each link length or origin error of the robot 310) based on the measured distance data. The robot calibration system 100 may receive the control distance data (e.g., data used by the robot controller 300 to control the robot 310) from the robot controller 300. The robot calibration system 100 may calculate the difference (or the distance error) between the measured distance data and the control distance data. The robot calibration system 100 may change the parameters based on the calculated distance error. The robot calibration system 100 may change or adjust its operational parameters until the distance error becomes less than the reference error. According to one embodiment, the robot calibration system 100 may calibrate parameters of the remaining links except for a first link (e.g., a link fixed to a ground to perform a rotational movement) through the distance-based parameter optimization.

According to one embodiment, the robot calibration system 100 may specify the robot coordinate system (e.g., the reference coordinate system of the robot 310 used by the robot controller 300) based on the parameters optimized based on the distance. For example, the robot calibration system 100 may calculate the robot coordinate system using a position of the robot 310, and a position of the robot front-end 311 viewed from the measuring device 200.

According to one embodiment, a relationship between a relative coordinate matrix $T_L^R$ (e.g., a first relative coordinate matrix) of the robot 310 viewed from the measuring device, a relative coordinate matrix $T_L^F$ (e.g., a second relative coordinate matrix) of the robot front-end 311 viewed from the measuring device, and a relative coordinate matrix $T_R^F$ (e.g., a third relative coordinate matrix) of the robot front-end 311 viewed from the robot 310 may be expressed as in Equation 1. A relative coordinate matrix T, which is a transform matrix representing a linear movement of three-dimensional coordinates, may have four dimensions. The four-dimensional relative coordinate matrix T may be implemented as a three-dimensional rotation matrix R (e.g., rotational movement) and a relative position p (e.g., linear movement) in three dimensions.

$$T_L^F = T_L^R \cdot T_R^F \quad \text{[Equation 1]}$$

When marking the position information in the three dimensions from Equation 1, a relationship between a measured position coordinate $p_L^F$ where the measuring device measured the position of the robot front-end 311, a rotation matrix $R_L^R$ of the robot 310 viewed from the measuring device, a control position coordinate $p_R^F$ where the robot 310 controlled the position of the robot front-end 311, and a relative position $p_L^R$ of the robot 310 viewed from the measuring device may be expressed as in Equation 2. In Equation 2, the robot coordinate system may include the rotation matrix $R_L^R$ of the robot 310 viewed from the measuring device and the relative position $p_L^R$ of the robot 310 viewed from the measuring device. The robot calibration system 100 may specify the robot coordinate system by calculating the rotation matrix $R_L^R$ of the robot 310 viewed from the measuring device and the relative position $p_L^R$ of the robot 310 viewed from the measuring device through Equation 2. Hereinafter, a method for obtaining the rotation matrix $R_L^R$ of the robot 310 viewed from the measuring device and the relative position $p_L^R$ of the robot 310 viewed from the measuring device will be described.

$$p_L^F = R_L^R \cdot p_R^F + p_L^R \quad \text{[Equation 2]}$$

In Equation 2, the measured position coordinate $p_L^F$ may be received from the measuring device, and the control position coordinate $p_R^F$ may be received from the robot controller 300. A difference between an i-th measured position coordinate $p_L^{F^i}$ and a j-th measured position coordinate $p_L^{F^j}$ among n measured position data may be expressed as in Equation 3.

$$p_L^{F^i} - p_L^{F^j} = R_L^R \cdot (p_R^{F^i} - p_R^{F^j}) \quad \text{[Equation 3]}$$

In Equation 3, when it is set to $p_L^{F^{ij}} = p_L^{F^i} p_L^{F^j}$, $p_R^{F^{ij}} = p_R^{F^i} p_R^{F^j}$, the difference between the two coordinates from the measured position data may be expressed as in Equation 4 in all cases.

$$[p_L^{F^{12}}, p_L^{F^{13}}, \ldots, p_L^{F^{n-1,n}}] = R_L^R \cdot [p_R^{F^{12}}, p_R^{F^{13}}, \ldots, p_R^{F^{n-1,n}}] \quad \text{[Equation 4]}$$

In Equation 4, when it is set to $M_L^F = [p_L^{F^{12}}, p_L^{F^{13}}, \ldots, p_L^{F^{n-1,n}}]$, $M_R^F = [p_R^{F^{12}}, p_R^{F^{13}}, \ldots, p_R^{F^{n-1,n}}]$, the rotation matrix $R_L^R$ of the robot 310 viewed from the measuring device may be expressed as in Equation 5. In this connection, $M_R^{F\dagger}$ is pseudo-inverse matrix.

$$R_L^R = M_L^F M_R^{F\dagger} \quad \text{[Equation 5]}$$

However, in general, the rotation matrix R obtained in this manner does not satisfy a condition of $R^T R = I$. To solve this problem, the robot calibration system 100 may obtain the rotation matrix $R_L^R$ of the robot 310 viewed from the measuring device that satisfies the condition of $R^T R = I$ using singular value decomposition. The relative position $p_L^R$ of the robot 310 viewed from the measuring device may be calculated through Equation 2. Thus, the robot calibration system 100 may determine the robot coordinate system based on the measured position coordinate $p_L^F$ and the control position coordinate $p_R^F$.

According to one embodiment, the method for obtaining the robot coordinate system may be described with reference to FIGS. 3A to 3C. In FIGS. 3A to 3C, the robot coordinate system may be represented as {R}, the coordinate system of the measuring device 200 may be represented as {L}, and a robot front-end coordinate system may be represented as {F}. For example, in FIG. 3A, it is assumed that an initial position coordinate of the robot front-end 311 is (0, 0, 100). In FIG. 3B, it is assumed that the robot front-end 311 is rotated by −90 degrees relative to a X2 axis of the robot coordinate system. In FIG. 3C, it is assumed that the robot front-end 311 is rotated by +90 degrees relative to the X2 axis of the robot coordinate system. Accordingly, relative coordinate matrices of {F1}, {F2}, and {F3} may be expressed as in Equations 6 to 8.

$$T_R^{F1} = \begin{bmatrix} 1 & 0 & 0 & 0 \\ 0 & 1 & 0 & 0 \\ 0 & 0 & 1 & 100 \\ 0 & 0 & 0 & 1 \end{bmatrix} \quad \text{[Equation 6]}$$

$$T_R^{F2} = \begin{bmatrix} 1 & 0 & 0 & 0 \\ 0 & \cos(-90) & -\sin(-90) & 50 \\ 0 & \sin(-90) & \cos(-90) & 50 \\ 0 & 0 & 0 & 1 \end{bmatrix} = \begin{bmatrix} 1 & 0 & 0 & 0 \\ 0 & 0 & 1 & 50 \\ 0 & -1 & 0 & 50 \\ 0 & 0 & 0 & 1 \end{bmatrix} \quad \text{[Equation 7]}$$

$$T_R^{F3} = \begin{bmatrix} 1 & 0 & 0 & 0 \\ 0 & \cos(90) & -\sin(90) & -50 \\ 0 & \sin(90) & \cos(90) & 50 \\ 0 & 0 & 0 & 1 \end{bmatrix} = \begin{bmatrix} 1 & 0 & 0 & 0 \\ 0 & 0 & -1 & -50 \\ 0 & 1 & 0 & 50 \\ 0 & 0 & 0 & 1 \end{bmatrix} \quad \text{[Equation 8]}$$

It is assumed that the positions of the robot front-end 311 measured by the measuring device are (−1000, 0, 100), (−950, 0, 50), and (−1050, 0, 50). When Equation 2 is applied to each case of the {F1}, {F2}, and {F3} based on Equations 6 to 8, Equations 9 to 11 may be obtained.

$$\begin{bmatrix} -1000 \\ 0 \\ 100 \end{bmatrix} = R_L^R \begin{bmatrix} 0 \\ 0 \\ 100 \end{bmatrix} + p_L^R \quad \text{[Equation 9]}$$

$$\begin{bmatrix} -950 \\ 0 \\ 50 \end{bmatrix} = R_L^R \begin{bmatrix} 0 \\ 50 \\ 50 \end{bmatrix} + p_L^R \quad \text{[Equation 10]}$$

$$\begin{bmatrix} -1050 \\ 0 \\ 50 \end{bmatrix} = R_L^R \begin{bmatrix} 0 \\ -50 \\ 50 \end{bmatrix} + p_L^R \quad \text{[Equation 11]}$$

When Equations 3 and 4 are applied to Equations 9 to 11, Equation 12 corresponding to Equation 4 may be obtained.

$$\begin{bmatrix} -50 & 50 & 100 \\ 0 & 0 & 0 \\ 50 & 50 & 0 \end{bmatrix} = R_L^R \begin{bmatrix} 0 & 0 & 0 \\ -50 & 50 & 100 \\ 50 & 50 & 0 \end{bmatrix} \quad \text{[Equation 12]}$$

When Equation 5 is applied to Equation 12, Equation 13 may be obtained.

$$R_L^R = \begin{bmatrix} -50 & 50 & 100 \\ 0 & 0 & 0 \\ 50 & 50 & 0 \end{bmatrix} \begin{bmatrix} 0 & 0 & 0 \\ -50 & 50 & 100 \\ 50 & 50 & 0 \end{bmatrix}^+ = \begin{bmatrix} 0 & 1 & 0 \\ 0 & 0 & 0 \\ 0 & 0 & 1 \end{bmatrix} \quad \text{[Equation 13]}$$

When the rotation matrix $R_L^R$ of the robot 310 viewed from the measuring device that satisfies the condition of $R_L^{R^T} R_L^R = I$ is recalculated using the singular value decomposition, the rotation matrix $R_L^R$ may be expressed as in Equation 14.

$$R_L^R = \begin{bmatrix} 0 & 1 & 0 \\ -1 & 0 & 0 \\ 0 & 0 & 1 \end{bmatrix} \quad \text{[Equation 14]}$$

When Equation 14 is substituted into Equation 9, the relative position $p_L^R$ of the robot 310 viewed from the measuring device may be calculated as in Equation 15.

$$p_L^R = \begin{bmatrix} -1000 \\ 0 \\ 0 \end{bmatrix} \quad \text{[Equation 15]}$$

Based on Equation 14 and Equation 15, the relative coordinate matrix $T_L^R$ of the robot 310 viewed from the measuring device may be expressed as in Equation 16.

$$T_L^R = \begin{bmatrix} R_L^R & p_L^R \\ 0 & 1 \end{bmatrix} = \begin{bmatrix} 0 & 1 & 0 & -1000 \\ -1 & 0 & 0 & 0 \\ 0 & 0 & 1 & 0 \\ 0 & 0 & 0 & 1 \end{bmatrix} \quad \text{[Equation 16]}$$

Using Equation 16, the measured position data measured by the measuring device 200 may be converted to robot basic position data of the robot coordinate system.

According to one embodiment, in operation 140, the robot calibration system 100 may convert the measured position data using the specified robot coordinate system. For example, the robot calibration system 100 may generate the robot reference position data converted from the measured position data measured in operation 110 using the robot coordinate system specified in operation 130. The robot reference position data may be obtained by substituting the measured position data in Equation 2.

According to one embodiment, in operation 150, the robot calibration system 100 may perform the position-based parameter optimization based on robot reference position data. For example, the robot calibration system 100 may calculate the position error by comparing the robot reference position data and the control position data with each other. The robot calibration system 100 may adjust the parameters of the robot 310 until the position error falls to be less than the reference error.

According to one embodiment, in operation 160, the robot calibration system 100 may pass (e.g., transmit) the changed parameters to the robot controller 300. The robot controller 300 may store the changed parameters and then control the robot 310 based on the changed parameters.

Figure 4:
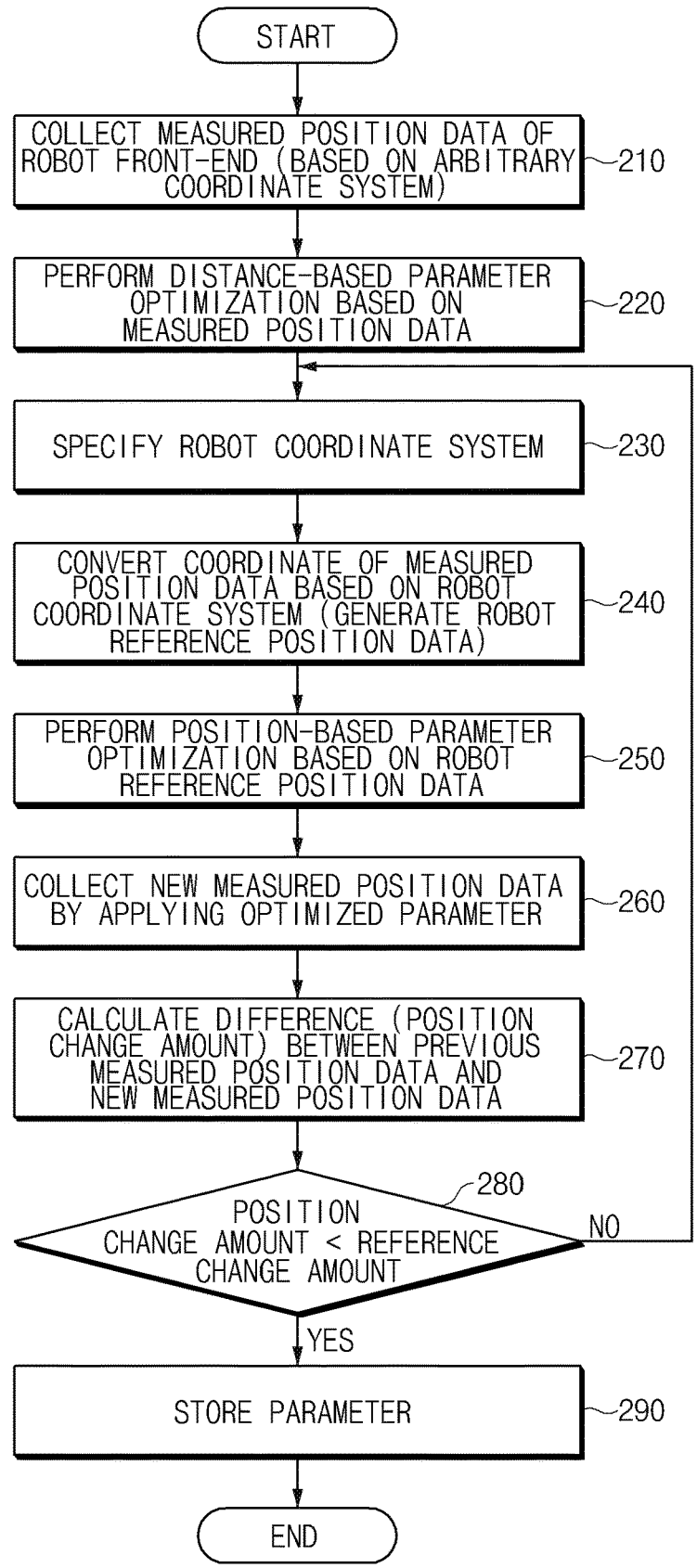
FIG. 4 is a flowchart illustrating an example robot calibration method according to certain embodiments of the disclosure.

FIG. 4 is a flowchart illustrating an example robot calibration method according to certain embodiments of the disclosure.

Referring to FIGS. 2A and 4, operations 210 to 250 may be the same as or similar to the operations 110 to 150 of FIG. 2A. Therefore, a description of the operations 210 to 250 will be omitted for the sake of brevity.

According to one embodiment, in operation 260, the robot calibration system 100 may collect new measured position data by applying the optimized parameters. For example, the robot calibration system 100 may store the measured position data collected in operation 210. The robot calibration system 100 may pass the parameters optimized in operation 250 to the robot controller 300. The robot calibration system 100 may apply the optimized parameters to control the robot controller 300 to move the robot 310 repeatedly, so that a position coordinate of the robot 310 matches the position coordinate of the robot front-end 311 controlled in operation 210. The robot calibration system 100 may control the measuring device 200 to measure a new position of the robot front-end 311 (e.g., generate new measured position data) in response to the repeated movement of the robot front-end 311. The robot calibration system 100 may collect the new measured position data.

According to one embodiment, in operation 270, the robot calibration system 100 may calculate a difference between the previous measured position data and the new measured position data (i.e., an amount in which the position has changed). For example, when the position change amount is large, it may indicate that the parameters of the robot 310 are not optimized.

According to one embodiment, when the position change amount is smaller than a reference change amount in operation 280, the robot calibration system 100 may terminate the parameter optimization operation and store the parameters in the robot controller 300 in operation 290. When the position change amount is greater than or equal to the reference change amount, the robot calibration system 100 may repeat execution of operations 230 to 270. The robot calibration system 100 may repeat performance of operations 230 to 270 (e.g., repeatedly perform the position-based parameter optimization in the specified robot coordinate system) until the position change amount converges to a value smaller than the reference change amount.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to embodiments of the disclosure, the robot calibration system that compensates for the shortcoming of each calibration by specifying the robot coordinate system through the distance-based calibration and then performing the position-based calibration based on the specified robot coordinate system may be provided.

In addition, various effects, directly or indirectly understood through this document, may be provided.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. A method for calibrating a robot, the method comprising:
collecting, using a measuring device, measured position data for the robot including at least a coordinate indicating a position of a front-end of the robot;
executing, using a processor, distance-based parameter optimization based on the measured position data;
specifying a robot coordinate system of the robot based on the measured position data;
generating, using the processor, robot reference position data by converting the measured position data based on the specified robot coordinate system;
performing, using the processor, position-based parameter optimization based on the robot reference position data; and
storing, using a memory, a parameter optimized through the position-based parameter optimization; and
transmitting, using a communication circuit, the stored optimized parameter to the robot to actuate movement of the robot based on the stored optimized parameter.

2. The method of claim 1, wherein the measured position data is measured using an arbitrary coordinate system set by the measuring device.

3. The method of claim 1, wherein the executing the distance-based parameter optimization includes:
calculating a first difference between two position coordinates of the measured position data and storing the calculated difference as measured distance data;
receiving, via the communication circuit, control distance data used for controlling actuation of the robot from a robot controller; and
adjusting a parameter controlling the actuation of the robot based on a second difference between the measured distance data and the control distance data.

4. The method of claim 3, wherein the parameter is adjusted such that the second difference after the adjustment is less than a reference error value.

5. The method of claim 1, wherein the executing the position-based parameter optimization further includes:
receiving, by the communication circuit, control position data utilized to control actuation of the robot from a robot controller; and
adjusting a parameter of the robot based on a difference between the robot reference position data and control position data.

6. The method of claim 5, wherein the parameter is adjusted such that the difference between the robot reference position data and the control position data after the adjusting is less than a reference error value.

7. The method of claim 1, wherein specifying the robot coordinate system is specified using a relationship between:
a first relative coordinate matrix of the robot viewed from the measuring device,
a second relative coordinate matrix of the front-end of the robot viewed from the measuring device, and
a third relative coordinate matrix of the robot front-end viewed from the robot.

8. The method of claim 1, wherein a measured position coordinate indicating the position of the front-end of the robot is reckoned as linearly moved according to a relative position of the robot viewed from the measuring device,
wherein the position of the front-end of the robot is controlled by actuation of the robot based on a rotation matrix for the robot viewed from the measuring device, and
wherein specifying the robot coordinate system includes calculating the rotation matrix for the robot and the relative position of the robot based on: 1) a measured position coordinate, and 2) a control position coordinate received from a robot controller for controlling actuation of the robot.

9. The method of claim 1, further comprising:
after transmitting the stored optimized parameter to the robot to actuate the movement of the robot, receiving new measured position data for the position of the front-end of the robot,
wherein the measured position data is re-measured after the executing the position-based parameter optimization.

10. The method of claim 9, further comprising:
calculating, by the processor, a position change amount including a difference between the measured position data and the new measured position data.

11. The method of claim 10, wherein when the position change amount is smaller than a reference change amount, the stored optimized parameter is utilized to control actuation of the robot.

12. The method of claim 10, wherein when the position change amount is greater than or equal to a reference change amount, the method further comprises re-executing:
the specifying of the robot coordinate system of the robot, the generating of the robot reference position data, and the performing of the position-based parameter optimization until the position change amount is adjusted to be less than the reference change amount.

13. A system for calibrating a robot, the system comprising:
a measuring device detecting a position and a travel distance of movement of the robot;
a communication circuit;
a memory; and
a processor operatively connected to the communication circuit and to the memory, wherein the processor is configured to:
receive, through the communication circuit, from a robot controller controlling actuation of the robot, control position data and control distance data for controlling a position of a robot front-end of the robot,
receive, using the measuring device, measured position data indicating a position of the front-end of the robot based on the control position data;
execute a distance-based calibration by comparing a measured distance data calculated based on the measured position data with the control distance data;
specify a robot coordinate system of the robot based on the measured position data and the control position data; and
perform position-based calibration by comparing a robot reference position data with the control position data, wherein the robot reference position data is converted from the measured position data based on the specified robot coordinate system.

14. The system of claim 13, wherein the processor is configured to:
calculate measured distance data based on a first difference between two position coordinates of the measured position data; and adjust a parameter of the robot based on a second difference between the measured distance data and the control distance data.

15. The system of claim 14, wherein the processor is configured to adjust the parameter controlling actuation of the robot until the second difference is less than a reference error value.

16. The system of claim 13, wherein a parameter of the robot is changed based on a third difference between the robot reference position data and the control position data.

17. The system of claim 16, wherein the parameter is adjusted until the third difference is less than a reference error value.

18. The system of claim 13, wherein the measured position data is measured based on an arbitrary coordinate system set by the measuring device.

19. The system of claim 13, wherein the processor is configured to:
store an optimized parameter for controlling actuation of the robot, the optimized parameter calculated by the performing the position-based calibration;
after applying the optimized parameter to control actuation of the robot, receive new measured position data at the position of the front-end of the robot; and
calculate a difference between the measured position data and the new measured position data and store the difference as a position change amount.

20. The system of claim 19, wherein the processor is configured to:
when the position change amount is smaller than a reference change amount, maintain application of the optimized parameter to control the actuation of the robot; and
when the position change amount is greater than or equal to the reference change amount, re-executing the position-based calibration including re-specifying the robot coordinate system and comparing new robot reference position data converted from the new measured position data based on the re-specified robot coordinate system with the control position data.

* * * * *